US011618567B2

(12) United States Patent
Overhiser et al.

(10) Patent No.: US 11,618,567 B2
(45) Date of Patent: Apr. 4, 2023

(54) SLAT CONSTRUCTION OF FULL-TIME BERTH FOR USE IN AEROSPACE APPLICATIONS

(71) Applicant: B/E Aerospace, Inc., Winston-Salem, NC (US)

(72) Inventors: Gerry Overhiser, Winston-Salem, NC (US); Ian L. Frost, Winston-Salem, NC (US); Adam Loewy, London (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/320,589

(22) Filed: May 14, 2021

(65) Prior Publication Data
US 2021/0354829 A1    Nov. 18, 2021

Related U.S. Application Data

(60) Provisional application No. 63/026,352, filed on May 18, 2020.

(51) Int. Cl.
*B64D 11/00* (2006.01)
*A47C 23/06* (2006.01)

(52) U.S. Cl.
CPC ............ *B64D 11/00* (2013.01); *A47C 23/061* (2013.01); *A47C 23/062* (2013.01); *B64D 2011/0069* (2013.01)

(58) Field of Classification Search
CPC ..... A47C 23/061; A47C 23/062; A47C 23/06; B64D 11/00; B64D 2011/0069
USPC ........................................ 5/400, 236.1, 237
See application file for complete search history.

(56) References Cited

U.S. PATENT DOCUMENTS

| | | | | |
|---|---|---|---|---|
| 2,349,839 A | * | 5/1944 | Apicella | ................... F16F 1/18 267/165 |
| 2,386,571 A | * | 10/1945 | Pettit | ...................... A47C 23/06 267/41 |
| 2,452,808 A | | 11/1948 | Morris | |
| 2,551,976 A | * | 5/1951 | Smith | .................. A47C 19/027 5/236.1 |

(Continued)

FOREIGN PATENT DOCUMENTS

| BE | 1008843 A3 | 8/1996 |
|---|---|---|
| CN | 2488393 Y | 5/2002 |

(Continued)

OTHER PUBLICATIONS

Search Report for European Application No. 21174527.8 dated Sep. 24, 2021, 9 pages.

*Primary Examiner* — Robert G Santos
(74) *Attorney, Agent, or Firm* — Suiter Swantz pc llo (57) ABSTRACT

An aircraft berth includes a bowed slat surface; the bowed slats provide a degree of cushioning apart from a foam mattress. The bowed slats are held in deformable brackets that allow the bowed slats to expand laterally as they are compressed vertically, and allow a degree of twisting of individual bowed slats. The bowed slats may be placed in a berth frame with greater or lesser density along the length of the berth frame to provide more or less support at particular locations. Alternatively, or in addition, bowed slats with greater cross-sectional thickness may be used were more support is desirable. The bowed slats may be organized in sub-frames that may be oriented to provide head and/or knee support.

13 Claims, 13 Drawing Sheets

(56) References Cited

U.S. PATENT DOCUMENTS

| | | | |
|---|---|---|---|
| 2,886,832 A | 5/1959 | Tony et al. | |
| 3,813,713 A * | 6/1974 | Kipfer | A47C 23/067 297/283.2 |
| 4,589,612 A | 5/1986 | Halim | |
| 4,638,517 A * | 1/1987 | Yang | A47C 23/064 5/915 |
| 4,679,848 A * | 7/1987 | Spierings | A47C 7/425 297/284.3 |
| 5,392,475 A * | 2/1995 | McCall | A47C 23/06 5/18.1 |
| 6,381,777 B1 | 5/2002 | Mitchell | |
| 6,836,912 B1 | 1/2005 | Morris | |
| 7,237,286 B1 * | 7/2007 | Kim | A61G 7/001 5/613 |
| 7,461,420 B2 * | 12/2008 | Kim | A47C 20/041 5/613 |
| 7,712,168 B2 * | 5/2010 | Kim | A61G 7/053 5/942 |
| 7,845,034 B2 * | 12/2010 | Kim | A61G 7/072 5/942 |
| 8,856,983 B2 | 10/2014 | Hayek | |
| 9,522,092 B2 | 12/2016 | Goddert | |
| 2007/0169266 A1 * | 7/2007 | Kim | A61G 7/001 5/607 |
| 2007/0251009 A1 * | 11/2007 | Kim | A61G 7/001 5/607 |
| 2009/0077744 A1 * | 3/2009 | Kim | A61G 7/001 5/202 |
| 2009/0077747 A1 * | 3/2009 | Kim | A61G 7/015 5/607 |
| 2019/0343292 A1 | 11/2019 | Porter et al. | |
| 2021/0354829 A1 * | 11/2021 | Overhiser | A47C 23/062 |

FOREIGN PATENT DOCUMENTS

| | | | |
|---|---|---|---|
| CN | 202446391 U | 9/2012 | |
| DE | 3018047 A1 | 11/1981 | |
| DE | 102015100703 A1 | 7/2016 | |
| EP | 0274371 B1 | 7/1992 | |
| EP | 0344105 B1 | 6/1993 | |
| EP | 0937428 A2 | 8/1999 | |
| EP | 2497392 A1 | 9/2012 | |
| EP | 3912911 A1 * | 11/2021 | B64D 11/00 |
| ES | 1047877 Y | 10/2001 | |
| GB | 2518886 A | 4/2015 | |
| IT | PN20000041 A1 | 1/2002 | |
| JP | 2001149415 A | 6/2001 | |
| WO | 2008086860 A1 | 7/2008 | |

* cited by examiner

SLAT CONSTRUCTION OF FULL-TIME BERTH FOR USE IN AEROSPACE APPLICATIONS

BACKGROUND

Airplane berths have generally comprised flat panels or hammocks, potentially with a foam mattress. Where the flat panels and hammocks are regarded as hard or uncomfortable, thicker mattresses may be employed. Thicker mattresses add weight, and aircraft are sensitive to weight. Furthermore, thick mattresses and flat slab berths take up significant space.

SUMMARY

In one aspect, embodiments of the inventive concepts disclosed herein are directed to an aircraft berth with a bowed slat surface. The bowed slats provide a degree of cushioning apart from a foam mattress. The bowed slats are held in deformable brackets that allow the bowed slats to expand laterally as they are compressed vertically, and allow a degree of twisting of individual bowed slats.

In a further aspect, the bowed slats may be placed in a berth frame with greater or lesser density along the length of the berth frame to provide more or less support at particular locations.

In a further aspect, bowed slats with greater cross-sectional thickness may be used were more support is desirable.

In a further aspect, the bowed slats may be organized in sub-frames that may be oriented to provide head and/or knee support.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an aircraft berth with a bowed slat surface. The bowed slats provide a degree of cushioning apart from a foam mattress. The bowed slats are held in deformable brackets that allow the bowed slats to expand laterally as they are compressed vertically, and allow a degree of twisting of individual bowed slats. The bowed slats may be placed in a berth frame with greater or lesser density along the length of the berth frame to provide more or less support at particular locations, or have greater cross-sectional thickness were more support is desirable. The bowed slats may be organized in sub-frames that may be oriented to provide head and/or knee support.

Figure 1:
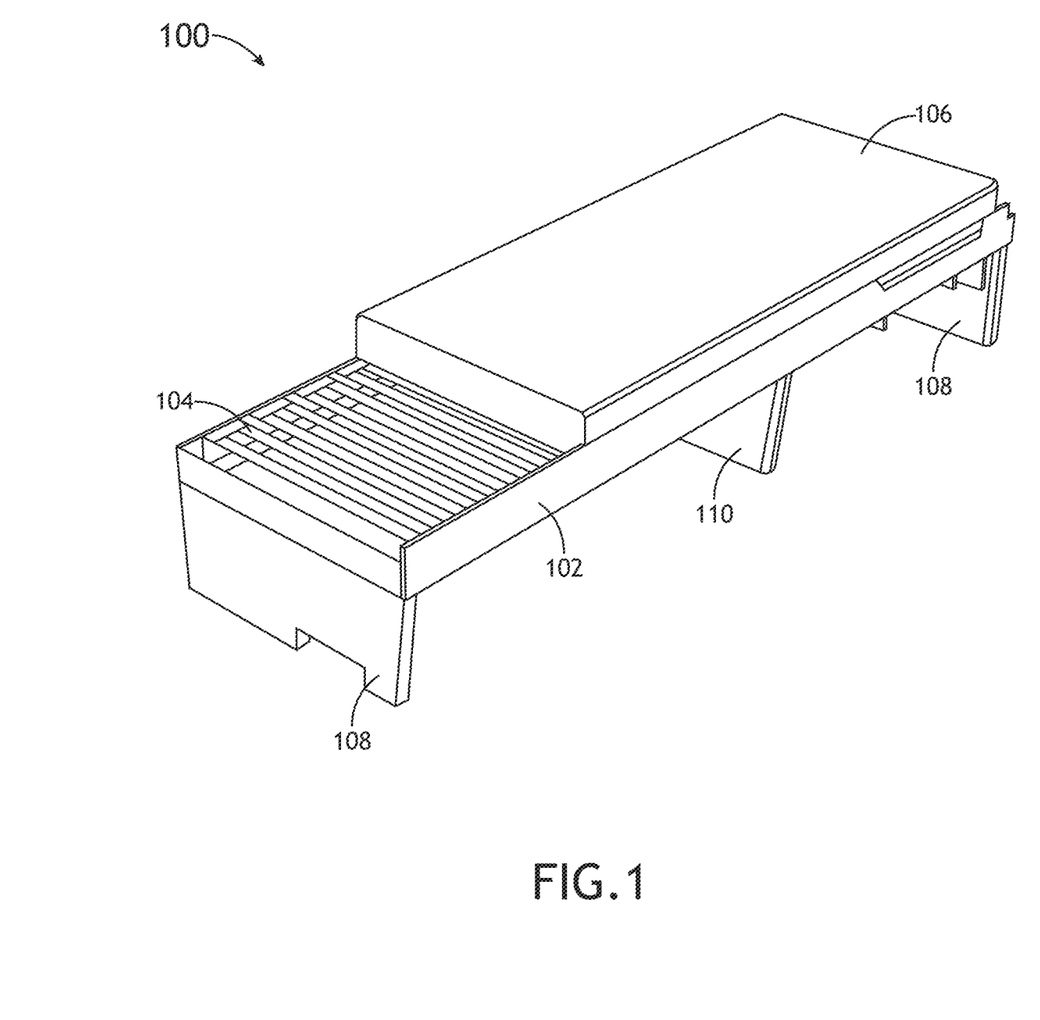
FIG. 1 shows a perspective view of an aircraft berth according to an exemplary embodiment.

Referring to FIG. 1, a perspective view of an aircraft berth 100 according to an exemplary embodiment is shown. The aircraft berth 100 comprises a frame 102 to support the edges of a plurality of bowed slats 104. The bowed slats 104 provide a supportive surface for a foam mattress 106; because the bowed slats 104 are disposed and oriented to absorb a downward load, the foam mattress 106 may be thinner than alternative aircraft berth mattresses, and provide a similar feel and/or comfort level for the consumer.

In at least one embodiment, the frame 102 is supported by terminal base supports 108 disposed at the edges of the frame 102. Furthermore, one or more central base supports 110 may be disposed at specific locations or periodically to prevent deformation of the frame 102 while in use.

In at least one embodiment, the frame 102 may be collapsible for stowage. For example, the terminal base supports 108 and central base supports 110 may be hinged such that the frame 102 may be stowed horizontally to take up minimal space. Alternatively, the terminal base supports 108 and central base supports may be removable and the mattress 106 stowed within the frame 102. In at least one embodiment, the bowed slats 104 may be removed, individually, in sets, or in sub-frames to facilitate stowage.

Figure 2:
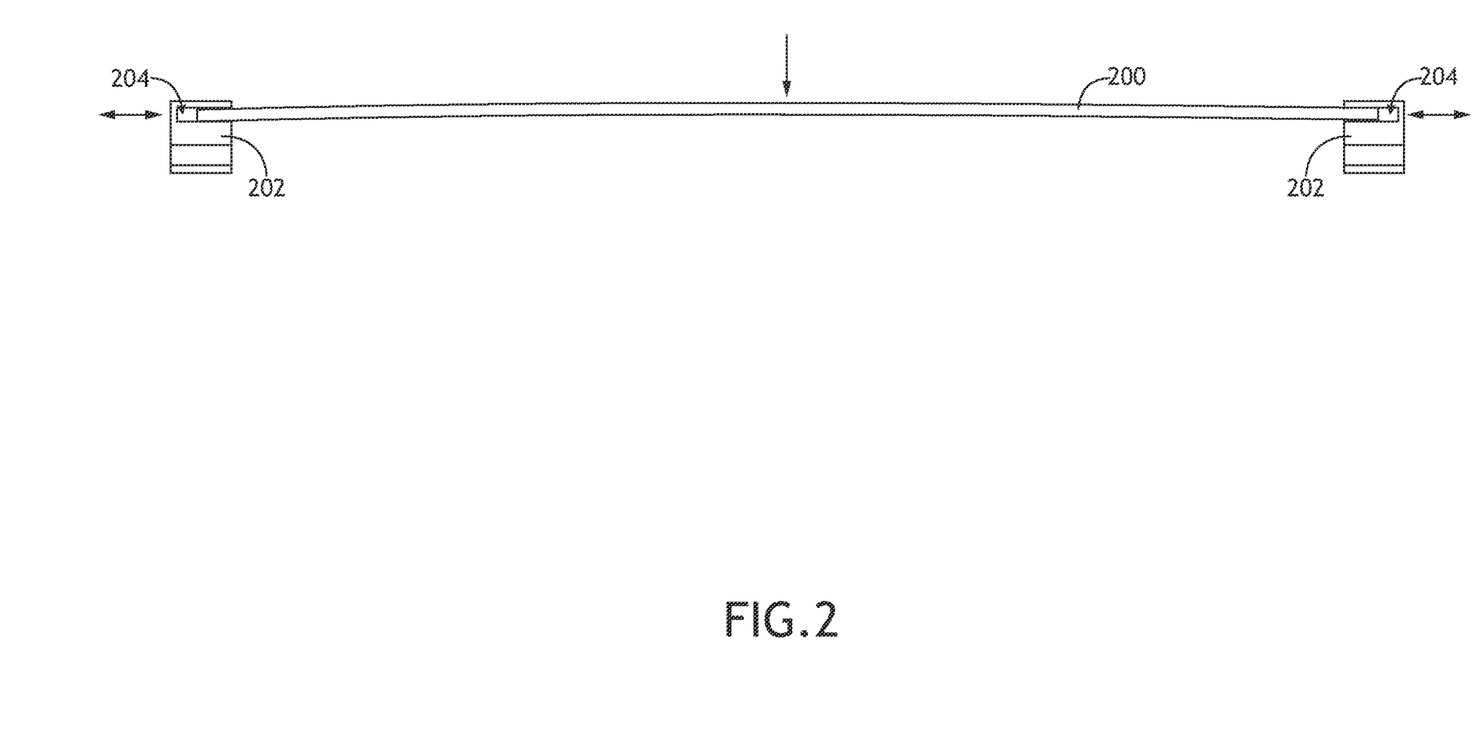
FIG. 2 shows a front view of a bowed slat according to an exemplary embodiment.

Referring to FIG. 2, a front view of a bowed slat 200 according to an exemplary embodiment is shown. The bowed slat 200 is disposed in a frame with the positive bow surface facing upwards (the bowed slat 200 is higher in the center than at the periphery). Each edge of the bowed slat 200 is disposed within a slat support 202. The slat supports 202 each define an expansion slot 204 that allows the bowed slat 200 to extend laterally as a load is applied to the positive bow surface.

Figure 3A:
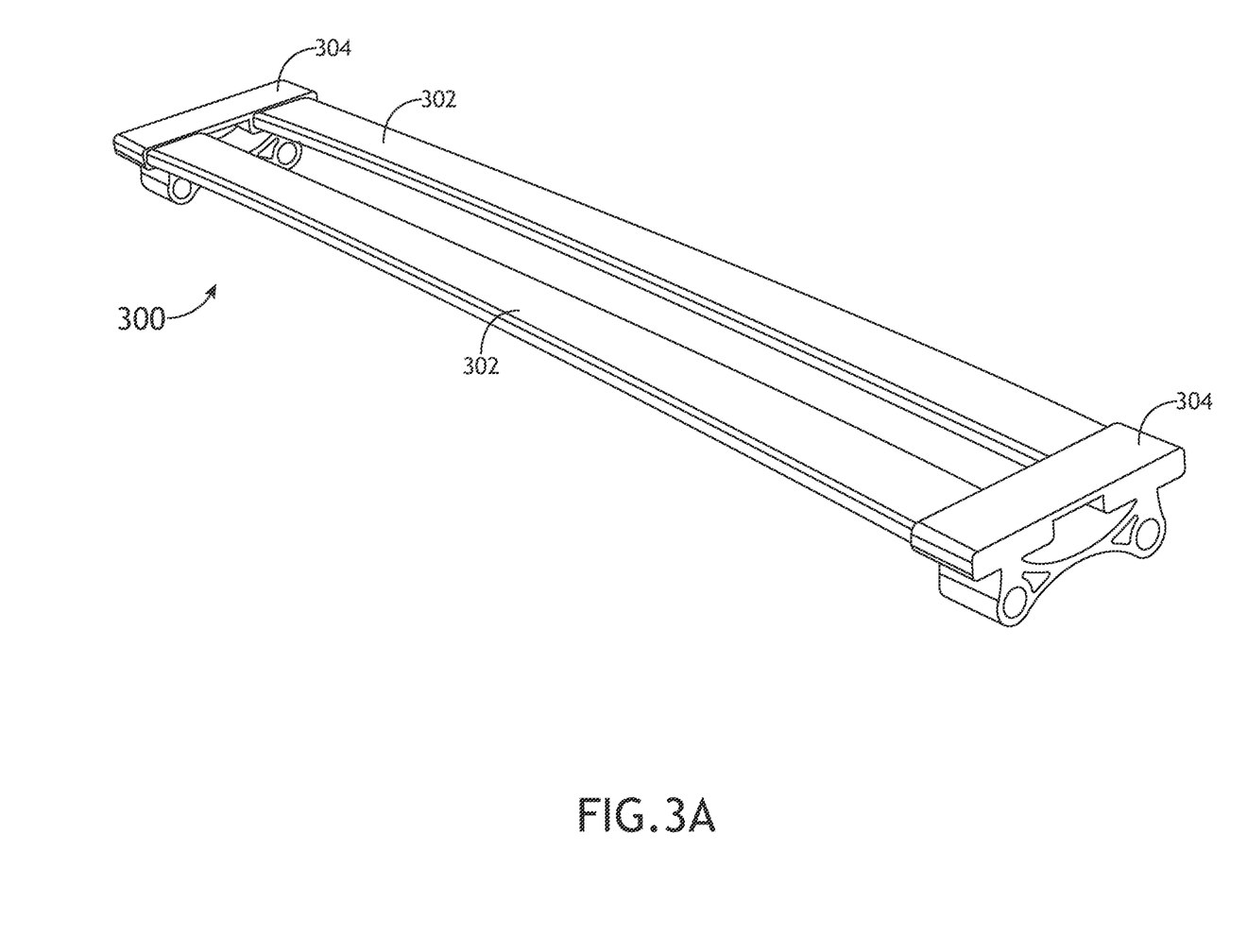
FIG. 3A shows a perspective view of a set of bowed slats according to an exemplary embodiment.
Figure 3B:
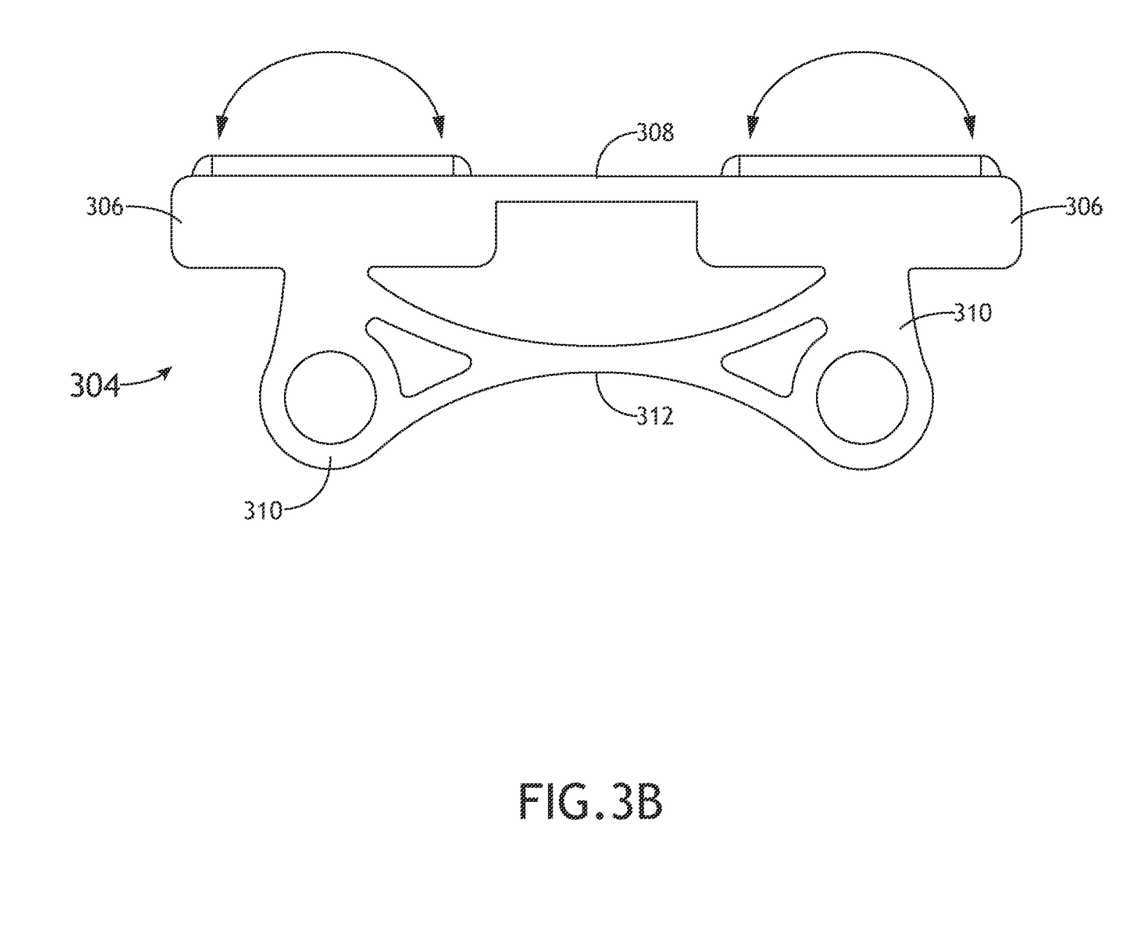
FIG. 3B shows a side view of a set of bowed slats according to an exemplary embodiment.

Referring to FIGS. 3A-3B, perspective and side views of a set 300 of bowed slats 302 according to an exemplary embodiment are shown. Bowed slats 302 may be organized into sets 300 of more than one via slat supports 304 having more than one slat engaging element 306. Each slat engaging element 306 defines a separate expansion slot.

In at least one embodiment, the slat supports 304 comprise a flexible material. The flexible material allows the expansion slot to partially resist the movement of the bowed slats 302 into the expansion slot to enhance the load bearing capacity of the berth. Each slat engaging element 306 may be connected to its neighboring slat engaging element 306 via an elastic portion 308 that defines a desired separation of the bowed slats 302, and also allows the slat engaging element 306 to rotate within a range defined by the elasticity of the elastic portion 308. Furthermore, the slat supports 304 may comprise one or more frame engaging elements 310. Where each slat engaging element 306 is associated with a corresponding frame engaging element 310, the frame engaging elements 310 may be connected with an elastic portion 312 to further defines the desired separation and rotation.

Figure 4A:
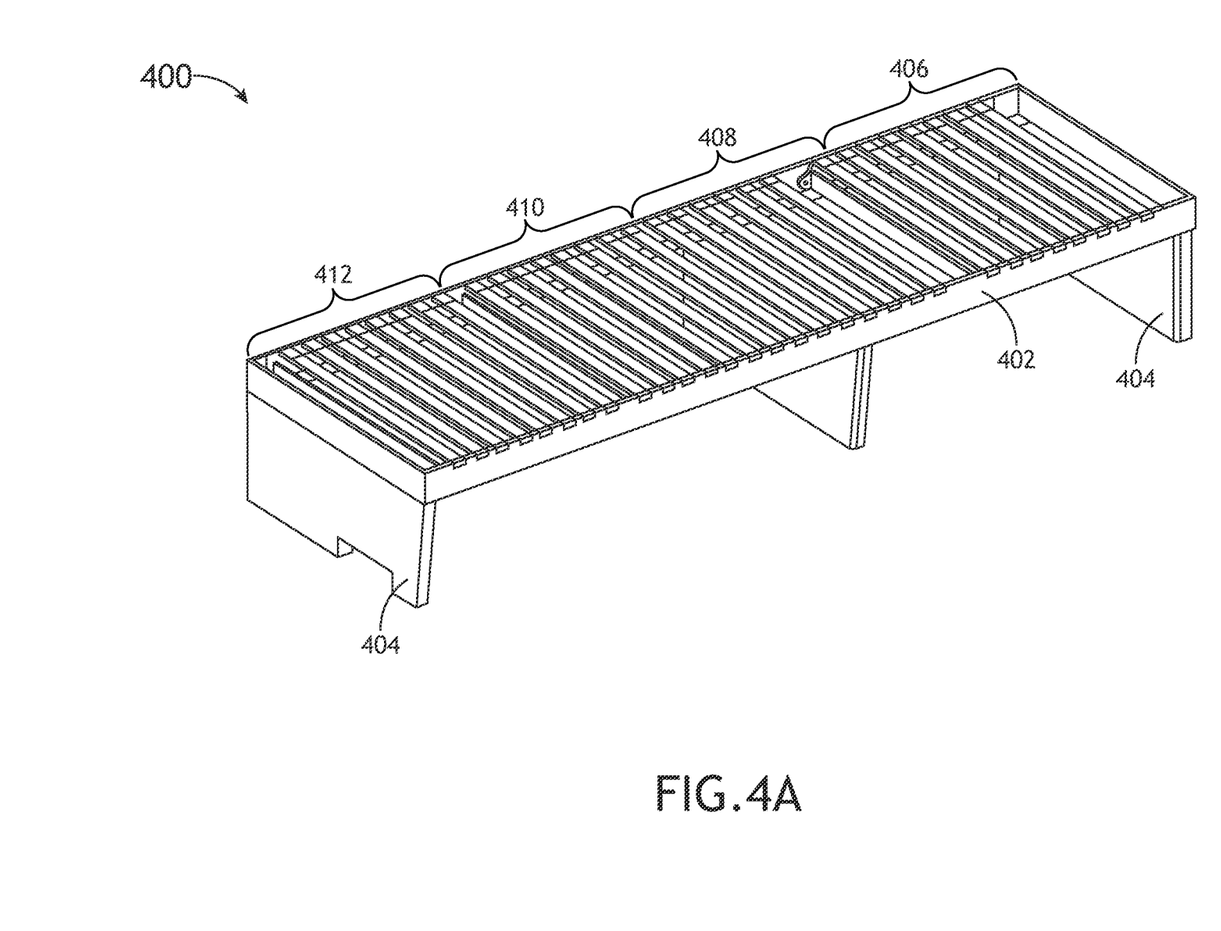
FIG. 4A shows a perspective view of an aircraft berth according to an exemplary embodiment.
Figure 4B:
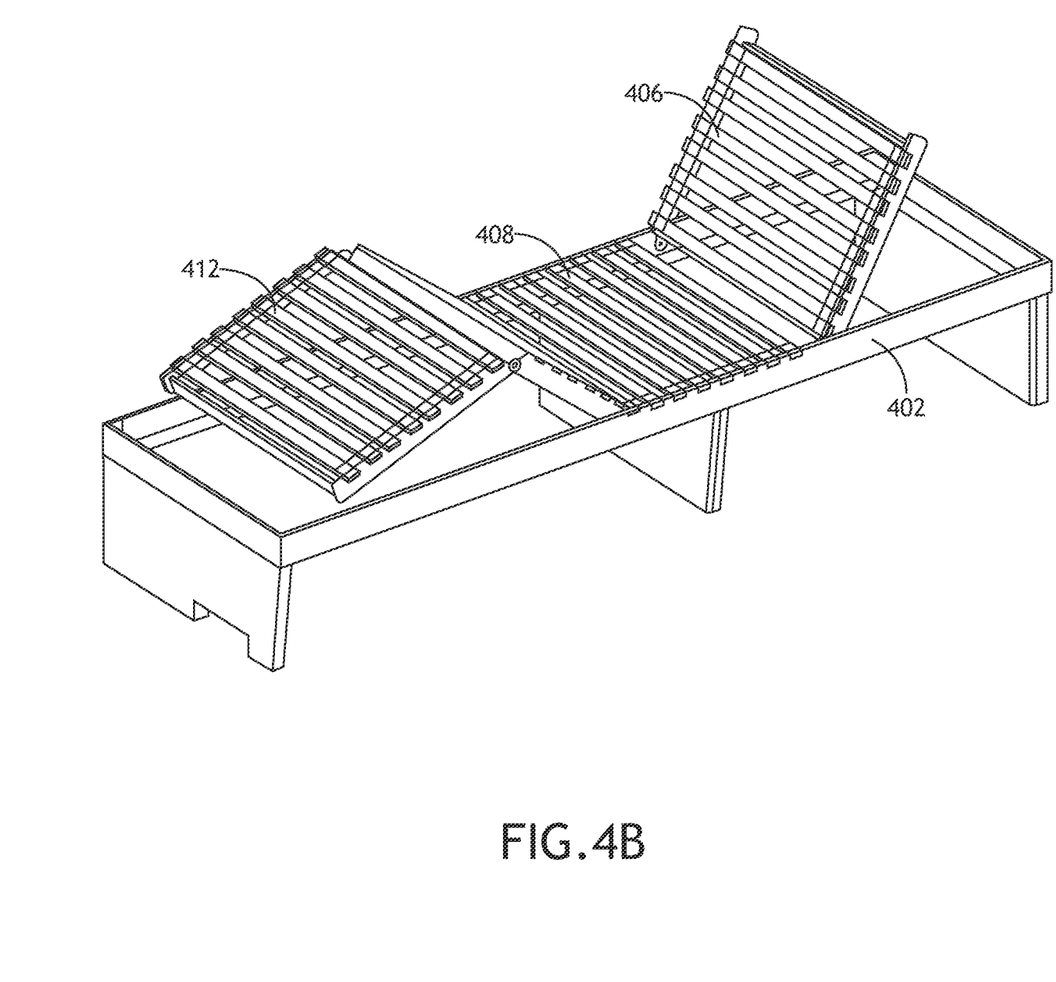
FIG. 4B shows a perspective view of an aircraft berth according to an exemplary embodiment.

Referring to FIGS. 4A-4B, perspective and side views of an aircraft berth 400 according to an exemplary embodiment are shown. The frame 400 and base supports 404 define a system for retaining a plurality of sub-frames 406, 408, 410, 412, each containing a plurality of bowed slats. In at least one embodiment, the sub-frames 406, 408, 410, 412 may be hinged. Each sub-frame 406, 408, 410, 412 may be associated with corresponding stops defined by the frame 402 such that the sub-frames 406, 408, 410, 412 may be placed in various configurations and orientations. For example, a first sub-frame 406 may be placed in an orientation with a raised back rest, including the corresponding foam mattress. Furthermore, a third sub-frame 410 and fourth sub-frame 412 may be placed in an orientation with a raised leg rest. Alternatively, or in addition, hinges joining the sub-frames 406, 408, 410, 412 may defines one or more orientations for the sub-frames 406, 408, 410, 412.

Figure 5:
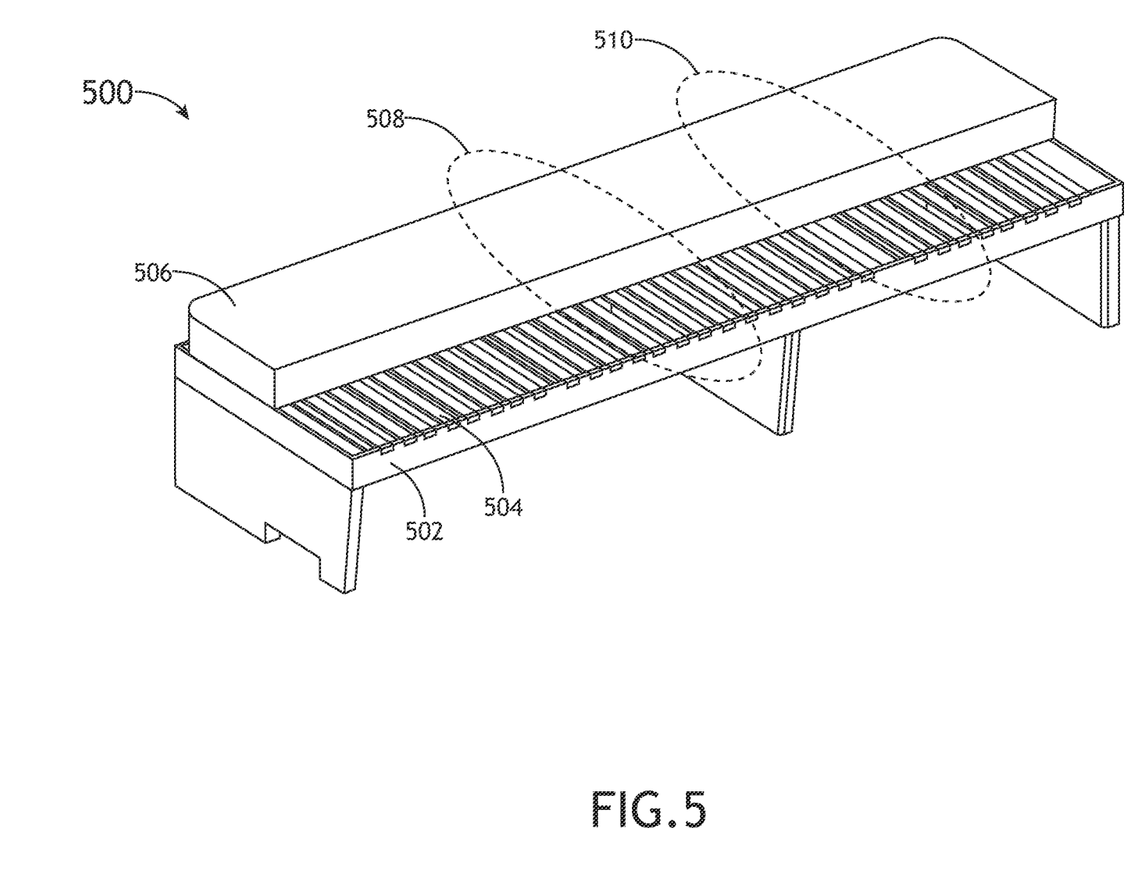
FIG. 5 shows a perspective view of an aircraft berth according to an exemplary embodiment.

Referring to FIG. 5, a perspective view of an aircraft berth 500 according to an exemplary embodiment is shown. Where the aircraft berth 500 includes a frame 502 to support a plurality of bowed slats 504 and a foam mattress 506, the load applied to the foam mattress 506 is not uniform. Areas generally associated with a user's hips 508 and areas generally associated with a user's shoulders 510 receive a greater portion of the load. In at least one embodiment, bowed slats 504 in the high load areas 508, 510 are disposed closer together than the bowed slats 504 outside those high load areas 508, 510. Such disposition may be defined by different slat supports; for example, the bowed slats 504 in the high load areas 508, 510 may be disposed in slat supports having shorter elastic portions (items 308, 312 in FIG. 3). Alternatively, or in addition, the bowed slats 504 in the high load areas 508, 510 may each comprise a generally thicker cross-section for added support. Such bowed slats 504 may color coded to facilitate their disposition in the high load areas 508, 510.

In at least one embodiment, one or more sub-frames (as in FIG. 4) may be disposed with respect to high load areas 508, 510 such that higher cross-sectional thickness bowed slats 504 or bowed slats 504 with higher density disposition are contained within specific sub-frames.

Figure 6:
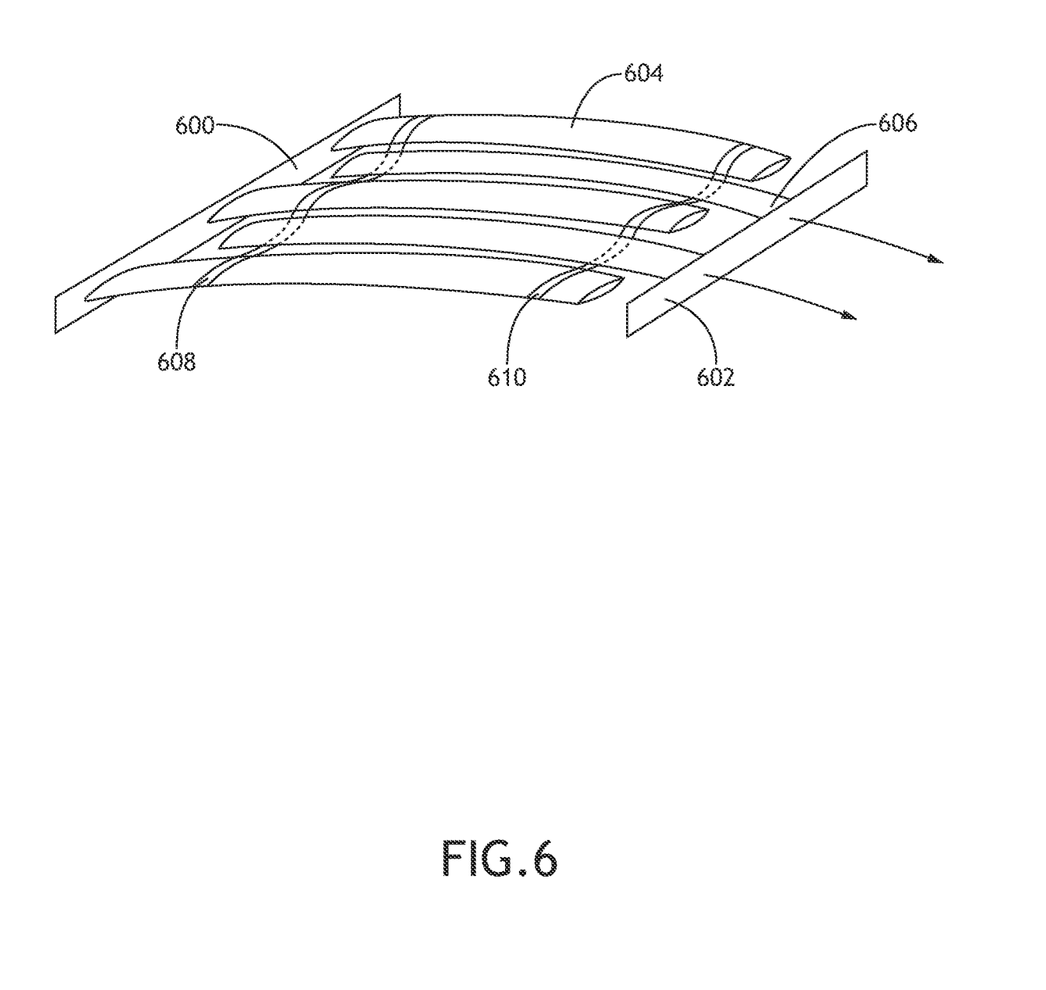
FIG. 6 shows a perspective view of bowed slats according to an exemplary embodiment.

Referring to FIG. 6, a perspective view of bowed slats 604, 606 according to an exemplary embodiment is shown. The bowed slats 604, 606 are disposed in separate sets 600, 602 where each set 600, 602 is connected along a single edge to one or more slat supports. The bowed slats 604, 606 of the sets 600, 602 are interleaved and collapsible such that the sets 600, 602 may be extended laterally to form a singular surface when the slat supports are placed in a corresponding frame.

In at least one embodiment, connecting elements 608, 610 may be fixedly connected to the bowed slats 604 in a first set 600 and slidably engage the bowed slats 606 in a second set 602 (and vice versa). When fully extended, the bowed slats 604, 606 may overlap in a central portion such that connecting elements 608, 610 provide additional support.

Figure 7A:
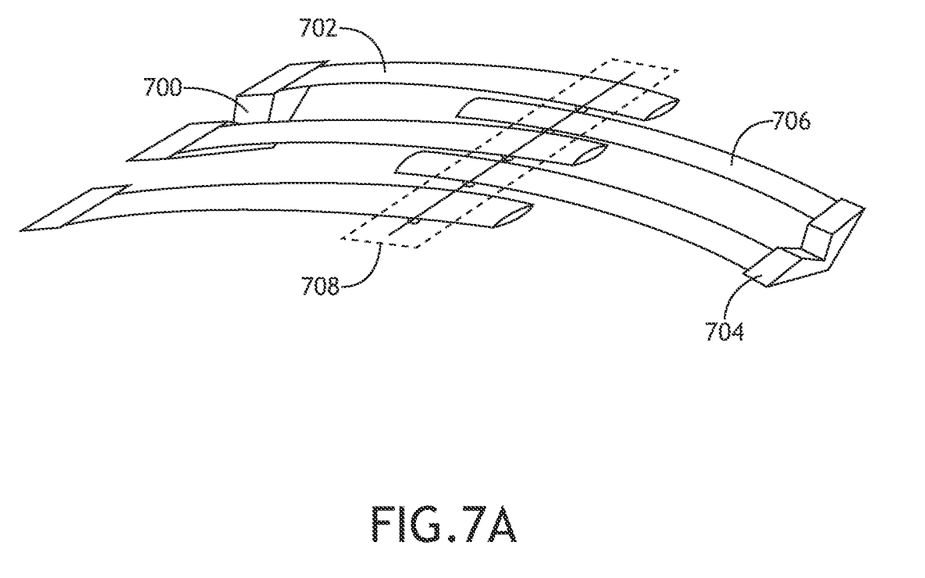
FIG. 7A shows a perspective view of bowed slats according to an exemplary embodiment.
Figure 7B:
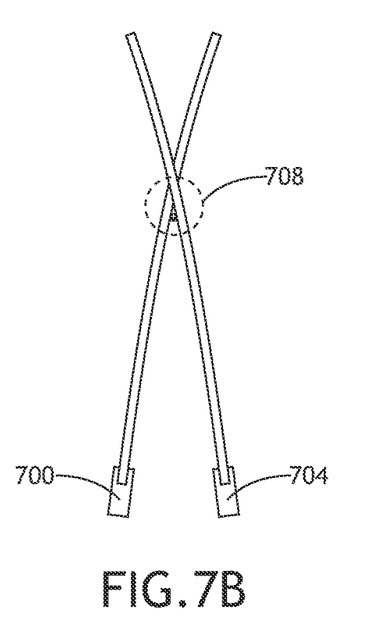
FIG. 7B shows a front view of bowed slats according to an exemplary embodiment.

Referring to FIGS. 7A-7B, perspective and side views of bowed slats 702, 706 according to an exemplary embodiment are shown. A first set of bowed slats 702 connected to one or more slat supports 700 are interleaved with a second set of bowed slats 706 connected to opposing slat supports 704. A central connection element 708 defines a center line connection the first set of bowed slats 702 to the second set of bowed slats 706 such that the bowed slats may be folded for stowage.

Figure 8:
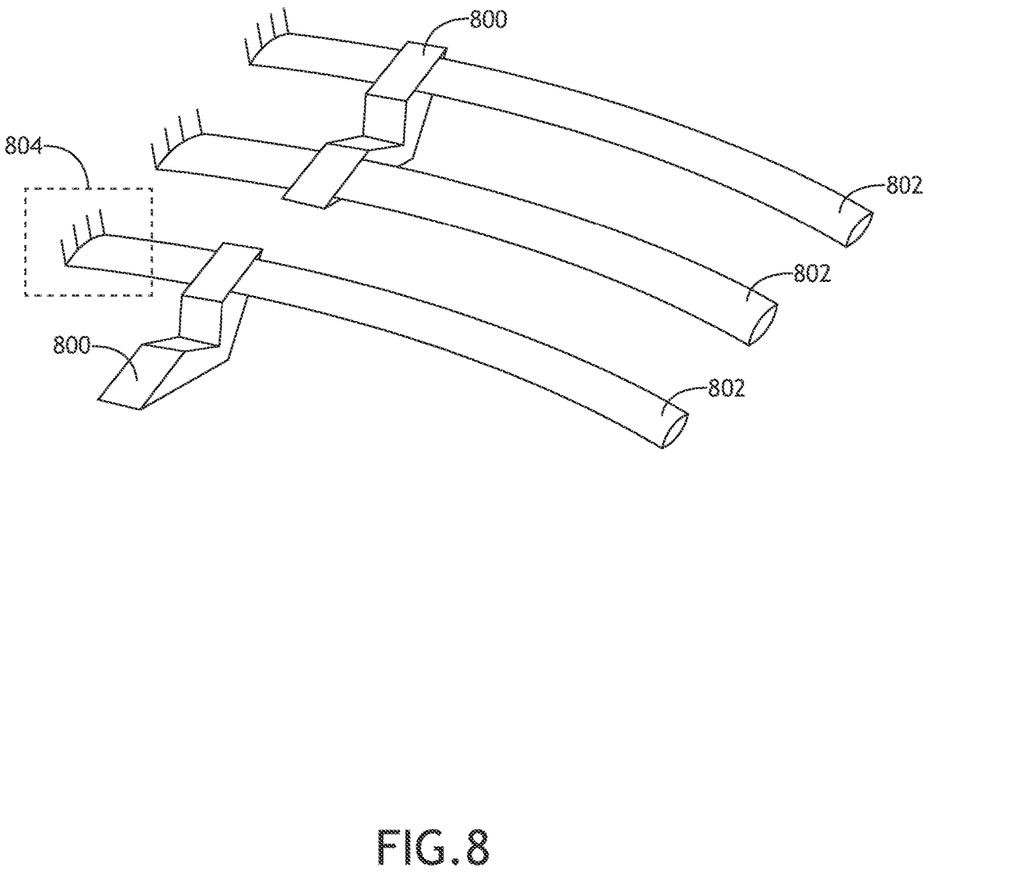
FIG. 8 shows a perspective view of bowed slats according to an exemplary embodiment.

Referring to FIG. 8, a perspective view of bowed slats 802 according to an exemplary embodiment is shown. Bowed slats 802 may be cantilevered such that only a single side is supported. In such embodiment, a first edge of each bowed slat 802 is disposed within a receiving portion 804 defined by a bulkhead. In at least one embodiment, slat supports 800 are disposed along one or more bowed slats 802, proximal to the receiving portion 804 but disposed some distance away. A support frame or support structure associated with the slat supports 800 provides some interstitial support to the bowed slats 802.

Figure 9A:
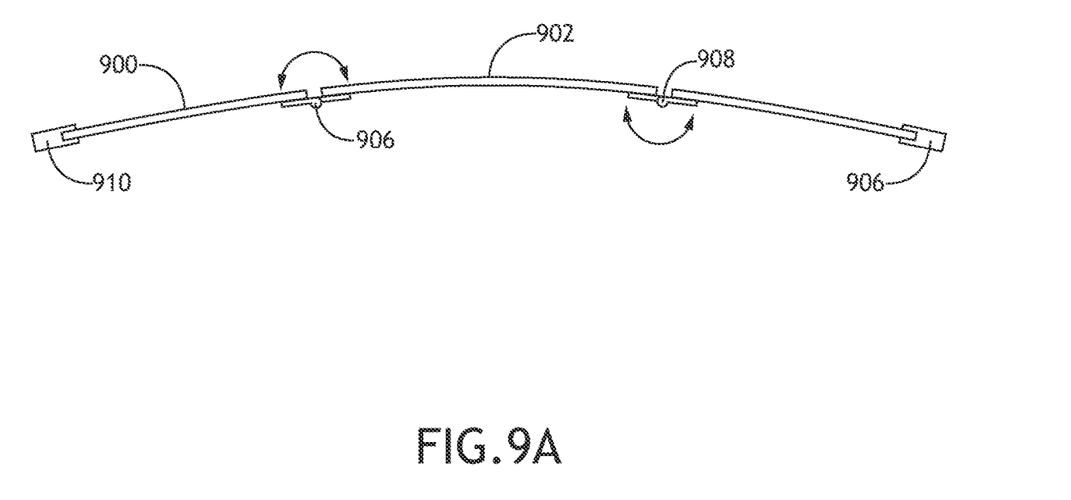
FIG. 9A shows a front view of bowed slats according to an exemplary embodiment.
Figure 9B:
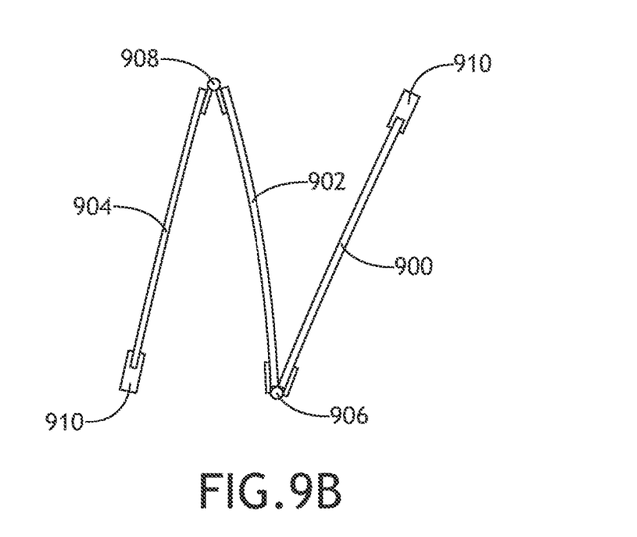
FIG. 9B shows a front view of bowed slats according to an exemplary embodiment.
Figure 10A:
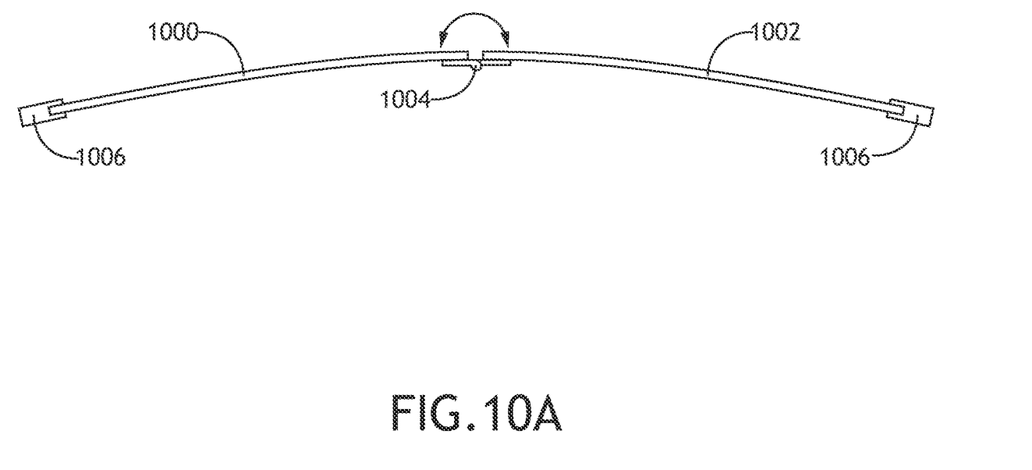
FIG. 10A shows a front view of bowed slats according to an exemplary embodiment.
Figure 10B:
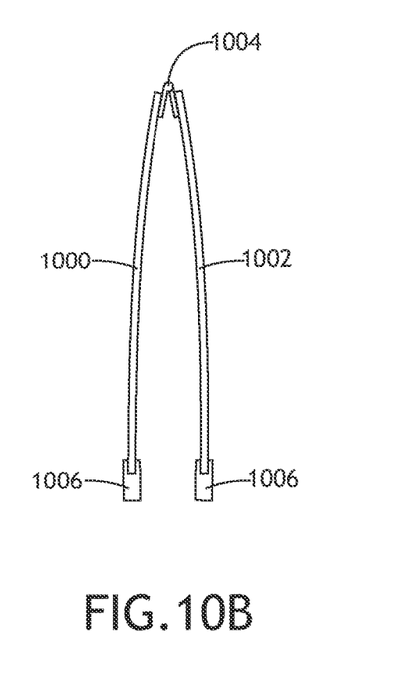
FIG. 10B shows a front view of bowed slats according to an exemplary embodiment.

Referring to FIGS. 9A-9B, front views of bowed slats according to an exemplary embodiment are shown. Each bowed slat comprises a plurality of sections 900, 902, 904, each joined to a neighboring section 900, 902, 904 by at least one hinge 906, 908. For example, a first section 900 may comprise a slat support disposed on a first edge and a first hinge 906 connected to a second edge. Likewise, a second section 902 may be connected to the first hinge 906 at a first edge and a second hinge 908 at a second edge. Finally, a third section 904 may be connected to the second hinge 908 at a first edge and a slat support 910 at a second edge.

One or more edges of each section 900, 902, 904 may be configured to interlock with the corresponding edge of the neighboring section 900, 902, 904 such that when fully extended, each section transfers its lateral load. Furthermore, one or more of the hinges 906, 908 may be lockable to maintain the sections 900, 902, 904 in a deployed configuration even when a load is applied.

Referring to FIGS. 10A-11B, front views of bowed slats according to an exemplary embodiment are shown. Each bowed slat comprises a plurality of sections 1000, 1002 joined together by at a hinge 1004 configured to fold the sections 1000, 1002 together, away from the positive bow surface. The proximal edges of each section 1000, 1002 may be configured to interlock to absorb a load.

Figure 11A:
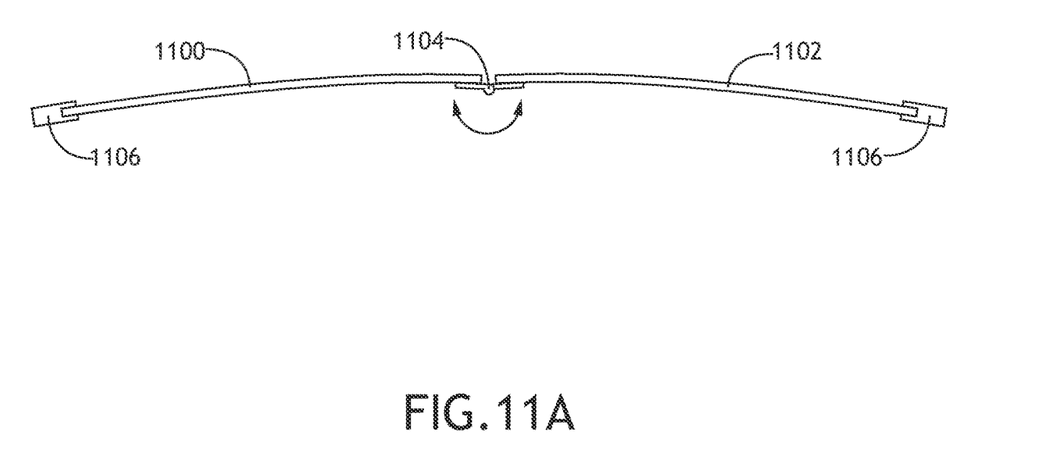
FIG. 11A shows a front view of bowed slats according to an exemplary embodiment.
Figure 11B:
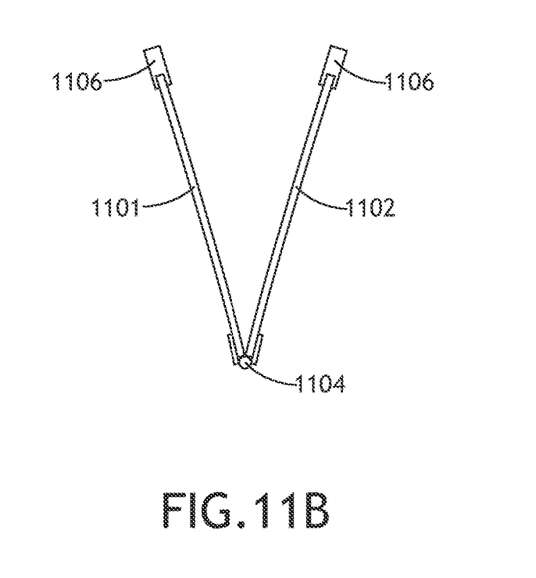
FIG. 11B shows a front view of bowed slats according to an exemplary embodiment.

Referring to FIGS. 11A-11B, front views of bowed slats according to an exemplary embodiment are shown. Each bowed slat comprises a plurality of sections 1100, 1102 joined together at a hinge 1104 configured to fold the sections 1100, 1102 together, toward the positive bow surface. The hinge 1104 may be lockable to maintain the sections 1100, 1102 in a deployed configuration even when a load is applied.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft berth comprising:
a frame;
a plurality of bowed slats, each comprises a first section and a second section joined at a hinge; and
a mattress pad,
wherein:
the first section defines a hinge proximal surface;
the second section defines a hinge proximal surface;
the first section hinge-proximal surface and the second section hinge-proximal surface are configured to interlock when fully extended to support a load on the bowed slat opposite the hinge;
the plurality of bowed slats are disposed in a plurality of densities;
a first density in the plurality of densities correspond to one or more high support locations;
a second density in the plurality of densities correspond to one or more low support locations; and
the first density is higher than the second density.

2. The aircraft berth of claim 1, wherein:
the plurality of bowed slats comprises a plurality of sets, each having a specific cross-sectional thickness;
a first set in the plurality of sets having a first cross-sectional thickness;
a second set in the plurality of sets having a second cross-sectional thickness less than the first cross-sectional thickness; and
the first set of bowed slats are disposed in the frame at one or more high support locations.

3. The aircraft berth of claim 1, wherein the plurality of bowed slats are organized into two or more hinged sub-frames.

4. The aircraft berth of claim 3, wherein:
a first sub-frame contains bowed slats disposed with the first density; and
a second sub-frame contains slats disposed with the second density.

5. The aircraft berth of claim 4, wherein the frame defines a plurality of stops configured to support the one or more hinged sub-frames in orientations including at least a raised back rest and an elevated leg rest.

6. The aircraft berth of claim 1, further comprising a plurality of slat supports, each of the slat supports configured to engage an end portion of at least one bowed slat; and engage a slat support surface of the frame.

7. The aircraft berth of claim 6, wherein:
the plurality of bowed slats comprises a first set of bowed slats having slat support edges disposed along a first edge of the frame and a second set of bowed slats having slat support edges disposed along a second edge of the frame opposite the first edge;
the first set of bowed slats and the second set of bowed slats are interleaved; and
the first set of bowed slats and second set of bowed slats are connected at a central pivot.

8. The aircraft berth of claim 6, wherein:
the plurality of bowed slats comprises a first set of bowed slats having slat support edges disposed along a first edge of the frame and a second set of bowed slats having slat support edges disposed along a second edge of the frame opposite the first edge;
the first set of bowed slats and the second set of bowed slats are interleaved; and
the first set of bowed slats and second set of bowed slats are configured to translate laterally from a first stowed configuration to a second deployed configuration.

9. The aircraft berth of claim 6, wherein each of the slat supports is configured to:

allow the edges of the corresponding bowed slats to travel within an expansion slot as a weight displaces the bowed slats;

allow the bowed slats to move laterally via elastic deformation of the slat supports; and partially absorb a load from the bowed slats via elastic deformation of a frame contacting portion of the slat support.

10. The aircraft berth of claim 1, further comprising a plurality of slat supports, each of the slat supports configured to engage at least one bowed slat, wherein:

a first edge of each bowed slat is configured to engage a bulkhead;

the frame is configured to engage each slat support; and each slat support is disposed proximal to the first edge and some distance from the bulkhead such that each bowed slat is cantilevered from the bulkhead.

11. An aircraft berth comprising:

a collapsible frame comprising a first support edge, a second support edge, and at least two base supports;

a plurality of bowed slats, each configured to engage at least one of the first support edge or the second support edge;

a plurality of slat supports, wherein each of the slat supports is configured to:

engage an end portion of at least two bowed slats; and engage the first support edge or the second support edge;

allow the edges of the corresponding bowed slats to travel within an expansion slot as a weight displaces the bowed slats;

allow the bowed slats to move laterally via elastic deformation of the slat supports; and partially absorb a load from the bowed slats via elastic deformation of a frame contacting portion of the slat support, and two or more hinged sub-frames, each configured to receive a set of bowed slats in the plurality of bowed slats, wherein:

the frame defines a plurality of stops configured to support the one or more hinged sub-frames in orientations including at least a raised back rest and an elevated leg rest.

12. The aircraft berth of claim 11, wherein:

the plurality of bowed slats are disposed in a plurality of densities;

the set of bowed slats in a first sub-frame are disposed with a first density in the plurality of densities;

the set of bowed slats in a second sub-frame are disposed with a second density in the plurality of densities; and the first density is higher than the second density.

13. The aircraft berth of claim 11, wherein:

the plurality of bowed slats comprise a plurality of cross-sectional thicknesses;

each bowed slat in the set of bowed slats in a first sub-frame comprise a first cross-sectional thickness in the plurality of cross-sectional thicknesses;

each bowed slat in the set of bowed slats in a second sub-frame comprise a second cross-sectional thickness in the plurality of cross-sectional thicknesses; and the first cross-sectional thickness is greater than the second cross-sectional thickness.

* * * * *